March 15, 1966   D. H. HILL ET AL   3,240,914
METHOD OF MAKING DIES
Filed Nov. 28, 1962

INVENTORS
David H. Hill, &
BY  Barton L. Christman

Hugh L. Fisher
ATTORNEY

United States Patent Office 3,240,914
Patented Mar. 15, 1966

3,240,914
METHOD OF MAKING DIES
David H. Hill, Birmingham, and Barton L. Christman, Detroit, Mich., assignors to General Motors Corporation, Detroit, Mich., a corporation of Delaware
Filed Nov. 28, 1962, Ser. No. 240,481
8 Claims. (Cl. 219—69)

This invention relates to an improved method of making mating male and female die members.

Punch and die sets necessarily must be made of hard durable material. If the material used requires hardening, there is always concern for heat treat distortion. In fact, to minimize this distortion, it is standard practice to make the punch and dies in short sections. Consequently, the material is expensive as is the fabrication and the design. Accordingly, it is proposed to provide a novel process for making die sets that requires mostly inexpensive materials and that simplifies both the fabrication and the design. It is further proposed by the method to bond hard material to the cutting edges of both the punch and die and thereafter by the electrical stock removal process cause the cutting edges to be machined to predetermined finished dimensions.

The foregoing and other objects and advantages of the invention will become apparent from the following description and the accompanying drawings in which.

Figure 1:
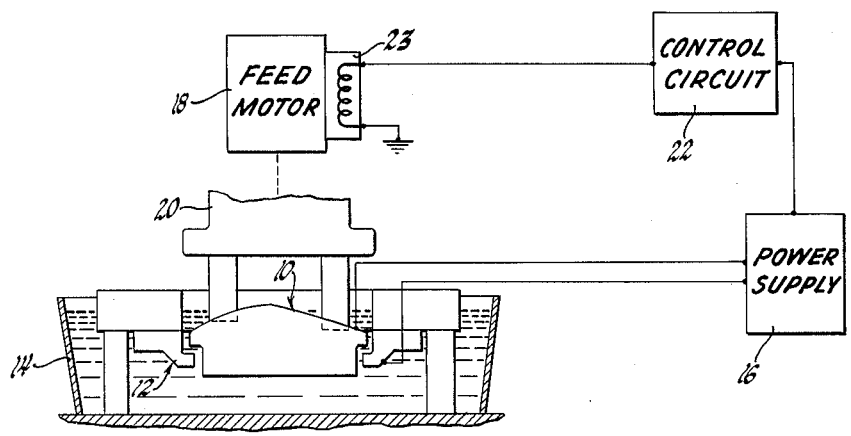
FIGURE 1 is a schematic showing of electrical stock removal apparatus having a punch and die set installed therein for machining according to the invention.

Referring first to FIGURE 1 of the drawing, the electrical stock removal apparatus is of the type used for carrying ou the process known as Electrical Discharge Machining. Any suitable apparatus may be used, e.g., that disclosed in the U.S. patent to Colten et al. 3,059,150. In the FIGURE 1 embodiment, a punch 10 and a die 12, which comprise the male and the female die members of a set to be machined, are installed within a tank 14 filled with any well known dielectric fluid. A power supply 16 is connected across a machining gap formed between the punch 10 and the die 12 and stock is removed in the usual way. As this stock is removed, the punch 10 and the die 12 are necessarily moved relative to each other.

In this embodiment the punch 10 is moved into the die 12 by a feed motor 18. If preferred, the punch 10 and the die 12 may be reversed as in FIGURE 2 and the punch 10 fed upwardly. The feed motor 18 is connected to a ram 20, which in turn is joined to the punch 10. The feed motor 18 may be operated electrically, by fluid pressure, or in any other known way.

The control of the gap spacing is achieved by a control circuit 22 of any appropriate type. For instance, the control circuit 22 can have applied thereto a voltage reflecting gap spacing and thereafter compare this voltage with a reference voltage representing the desired gap spacing so as to develop a signal voltage corresponding to any variation in the gap spacing relative to the desired gap spacing. This error signal can be applied to a force motor 23 and cause the feed motor 18 to maneuver the punch 10 in whatever direction is required to correct the gap spacing.

Figure 3:
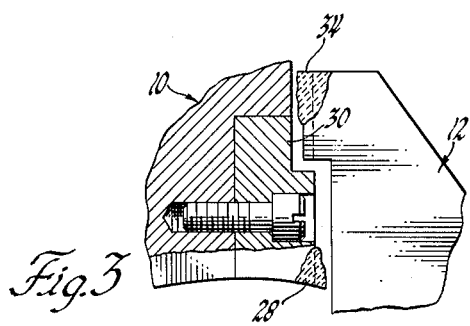
FIGURE 3 is a sectional view of a modified punch.

The punch 10 and the die 12 are according to the invention both formed of inexpensive stress-free mild steel. The punch 10 will have the configuration portrayed or any other shape and may be formed by any known machining method so that a machining surface 24, which is formed to the finished dimension, will have at one end a relief or undercut edge 26 and at the other end a cutting edge 28. If the punch 10 is to be made of cast iron, then as portrayed in FIGURE 3, stress-free mild steel inserts 30 may be attached to the cast iron body so that the same general configuration is obtained. Actually, these inserts 30 may be used beneficially at other times and with other than cast iron bodies, if needed.

Next, the cutting edge 28 of the punch 10 is chamfered and then a hard weld or fused alloy tool steel is bonded to the chamfered cutting edge, e.g., by welding, by the plasma flame spray process, by heli-arc, or by some other suitable process.

The die 12 is performed in a similar manner and is also made of stress-free mild steel. The die 12 is finished completely except that a machining surface 32 thereon is intentionally left oversize, e.g., $\frac{1}{32}$ to $\frac{1}{16}$ of an inch. This machining surface 32 has at the upper end a cutting edge 34 that similarly to the cutting edge 28 on the punch 10 is chamfered and then has applied thereto the hard fused alloy or the hard weld in the same way.

Figure 2:
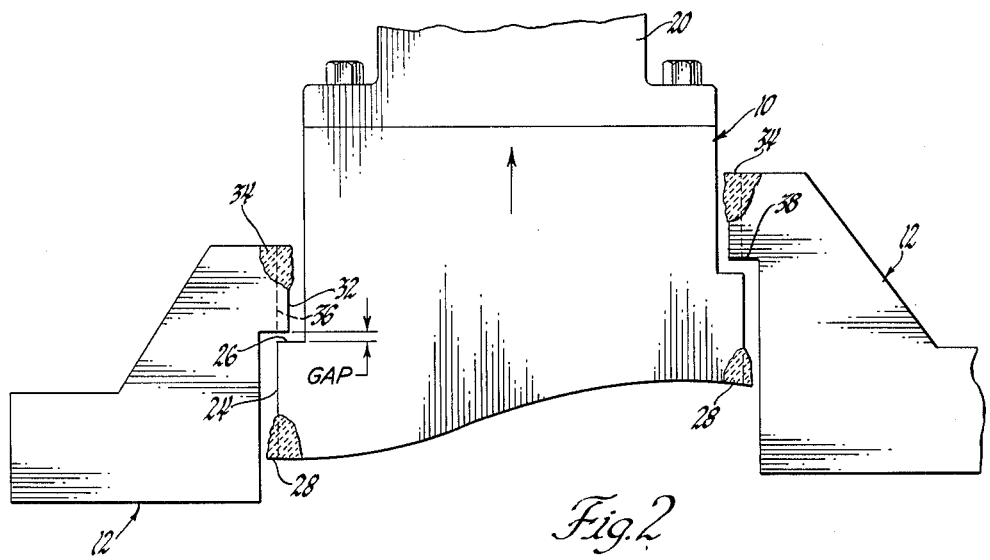
FIGURE 2 is an enlarged sectional view of the punch and die portrayed in FIGURE 1.

The punch 10 and the die 12 formed in this manner are now installed in the FIGURE 1 apparatus. The punch 10 is initially fed downwardly as viewed in FIGURE 1 or upwardly as viewed in FIGURE 2 so that initially the relief edge 26 on the cutting tool 10 will be opposite a corresponding surface on the die 12 and form therewith a machining gap. This is depicted in FIGURE 2. As the punch 10 is fed into the die 12 and assuming that the punch 10 is serving as the cutting tool electrode, e.g., when the punch 10 is the cathode and the die 12 is the anode, the relief edge 26 will perform as a machining edge and cause the die 12 to be machined to a final trim surface 36 corresponding to the desired finished dimension. This includes the die cutting edge 34. Erosion of the surface 24 on the punch 10 due to wear is not too significant for only the final dimension of the cutting edge 28 is a concern with punch 10. The surface 24 must, however, have a dimension that will enables the trim surface 36 to be finished to the desired dimension.

Now, the polarities are reversed so that the punch 10 becomes the anode and the die 12 the cathode. This is referred to as reverse erosion, since an edge 38 on the die 12 becomes the machining edge and the cutting edge 28 will be eroded to the finished dimension. By properly spacing the cutting edges 28 and 34 relative to each other, the feeding of the punch 10 can be continuous, i.e., the punch 10 is fed in the same direction without interruption.

The various sizes of the punch 10 and the die 12 both as to length and diameter must be carefully considered to insure that the wear ratios of the punch 10 and the die 12 are such that the desired finished dimensions will be obtained. This is well understood by those skilled with the EDM process, and therefore, further discussion is not considered necessary.

Also, if desired, an A.C. voltage may be supplied to the gap and the reverse erosion avoided. This necessitates selection of sizes based on a 1:1 wear ratio, for in effect simultaneous machining of both the punch 10 and the die 12 will occur.

It can be appreciated now that by preforming the punch 10 and die 12 of inexpensive stress-free mild steels, a considerable savings in material cost can be made. The only expensive material is that added to the cutting edges at 28 and 34. The designs of the die 12 and the tool 10 are simplified because they can be made in longer sections, there being no real concern for heat treat distortion. Additionally, the fabrication of the punch 10 and the die 12 is simplified. The punch 10 can be completely finished in its softened state; therefore, problems relative to the heat treat distortion are completely eliminated. Actually, the cutting edges 28 and 34 only require a small volume of material and a very high grade alloy can be used without increasing the conventional die cost such that longer die life with less maintenance is achieved.

The invention is to be limited only by the following claims.

We claim:

1. The method of making mating die members comprising the steps of applying hard cutting tool material to the cutting edges of both die members and electrically removing stock from one die member with the die members having opposite polarities and subsequently electrically removing stock from the other die member after reversing the polarities of the die members and as the die members are fed into each other so that the cutting edges on both die members are each machined last to predetermined finished dimensions.

2. The method of making male and female die members comprising the steps of applying hard cutting tool material to the cutting edges of both the male and the female die members and electrically removing stock from both the male and female die members simultaneously while feeding the male die member and the female die member into each other and during a single pass so that the die members machine each other and so that the cutting edges on both die members are each machined last and successively to predetermined finished dimensions.

3. The method of making mating male and female die members comprising the steps of bonding cutting tool material to the cutting edges of both the male die member and the female die member, installing the male and the female die members in electrical stock removal apparatus so that each serves as an opposite polarity electrode, and feeding the male and the female die members into each other so that initially the cutting edge on the female die member is machined and reversing the polarities of the die members so that subsequently the cutting edge on the male die member is machined, both the male and female die member cutting edges being each machined last to predetermined finished dimensions during a single pass of the die members relative to each other.

4. The method of making mating male and female die members comprising preforming the female die member and the male die member of an unhardened relatively soft conductive material so that each has cutting edges, applying cutting tool material to the cutting edges of both the female die member and the male die member, and electrically removing stock from both the female die member and the male die member simultaneously while feeding the female die member and the male die member into each other and during a single pass so that the die members machine each other and so that the cutting edges on both die members are each machined last and successively to predetermined finished dimensions.

5. The method of making mating male and female die members comprising the steps of preforming the male die member of relatively soft conductive material so as to have a machine surface of a certain contour and a cutting edge, preforming the female die member of relatively soft conductive material so as to have a machining surface of a certain rough dimension and a cutting edge, bonding cutting tool material to the cutting edges of both the male and female die members, installing the male and female cutting members in electrical stock removal apparatus so that the members serve as opposite polarity electrodes and are fed into each other, electrically removing stock initially from the female cutting member including the cutting edge, which is formed last, in accordance with the contour of machining surface on the male die member so as to finish the female die member to a predetermined finished dimension, reversing the polarity of the die members, and electrically removing stock subsequently from the male die member with the cutting edge of the male die member also formed last and to a certain finished dimension during the same pass of the die members relative to each other.

6. The method of making mating male and female die members comprising the steps of preforming the male die member of relatively soft and unhardened conductive material so as to have a machining edge thereon of a certain dimension and a cutting edge, bonding cutting tool material to the cutting edge of the male die member, preforming the female die member of relatively soft and unhardened conductive material so as to include a machining surface thereon of a certain dimension and a cutting edge, bonding cutting tool material to the cutting edge on the machining surface of the female die member, installing the male and female die members into electrical stock removal apparatus so that the members are fed into each other and so that the male and female die members serve respectively as the cathode and the anode, electrically removing stock initially from the machining surface on the female die member as the machining edge on the male die member proceeds therealong so that both the machining surface and the cutting edge of the female die member are machined to predetermined finished dimensions with the cutting edge of the female die member being machined last, and reversing the polarities of the male and female die members while continuing to feed the members into each other so as to electrically remove stock from the male die member with the cutting edge of the male die member being also machined last to a certain finished dimension and during the same pass of the die members relative to each other.

7. The method of making mating die members comprising the steps of applying hard cutting tool material to the cutting edges of both die members and electrically removing stock from both die members while each die member serves as an electrode and during a single pass of the die members relative to each other so that the cutting edges of both of the die members are each machined last and successively to their respective finished dimensions.

8. The method of making mating male and female die members comprising preforming the female die member and the male die member of one hardened relatively soft conductive material so that each has cutting edges, applying cutting tool material to the cutting edges of both the female die member and the male die member, and electrically removing stock from both of the die members as the female and the male die members are fed into each other during a single pass and while each die member is serving as an electrode so that the cutting edges of both of the die members are each machined last and successively to their respective finished dimensions.

References Cited by the Examiner

UNITED STATES PATENTS

| 2,800,566 | 7/1957 | Matulaitis | 76—107 X |
| 2,924,701 | 2/1960 | Stamper | 219—69 |
| 2,927,190 | 3/1960 | Dulebohn et al. | 219—69 |
| 3,063,310 | 11/1962 | Connoy | 219—77 X |
| 3,120,601 | 2/1964 | Berlin et al. | 219—69 |
| 3,148,446 | 9/1964 | Celovsky | 219—69 X |

RICHARD M. WOOD, *Primary Examiner.*

GRANVILLE Y. CUSTER, Jr., *Examiner.*